May 16, 1939.　　C. O. WEBSTER　　2,158,490
AUTOMATIC CHUCK JAW
Filed June 30, 1938

Inventor
Clarence O. Webster
By Shepherd & Campbell
Attorneys

Patented May 16, 1939

2,158,490

UNITED STATES PATENT OFFICE 2,158,490

AUTOMATIC CHUCK JAW

Clarence O. Webster, Springfield, Ohio, assignor of one-half to Harold Cooke, Springfield, Ohio Application June 30, 1938, Serial No. 216,850

1 Claim. (Cl. 279—123)

This invention relates to automatic jaws for chucks such, for example, as lathe chucks. However, these jaws may be used in any machine which is required to grip work and hold it in accurate parallelism. These include lathes, screw machines, grinders, boring mills and the like.

Figure 1:
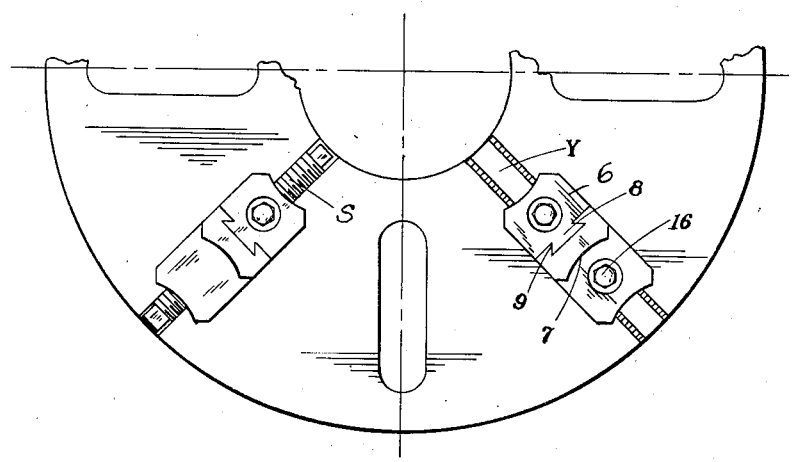
Figure 2:
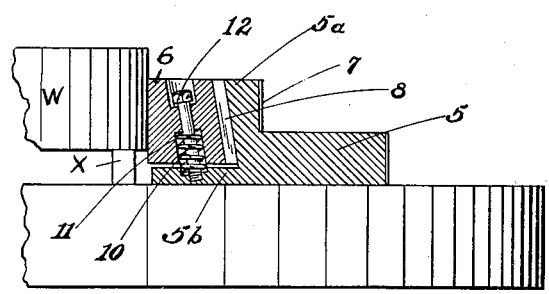

In the accompanying drawing, Figure 1 is a view of a part of the face plate of the chuck, showing two, only, of the jaws of the invention applied thereto, and Figure 2 is a view showing the chuck face plate in edge elevation and showing the chuck jaw in section.

Fig. 1 is intended to indicate that the method of adjusting the jaw bodily toward and from the center of the chuck, is not of importance. Many ways may be employed for moving the automatic chuck jaw bodily and radially over the face plate of the chuck.

The chuck jaw of the present invention is made in two main parts comprising the chuck jaw body 5 and the sliding jaw face 6. The body 5 is so shaped as to provide an upstanding part 5ª, the rear face of which is preferably of concave construction indicated at 7, in a way that is common in this art. The sliding jaw face 6 is provided upon its rear portion with a dove-tail rib 8 which fits into a correspondingly shaped recess 9 of the jaw body. The resultant tongue and groove connection is disposed at an angle with respect to the vertical as is illustrated in Fig. 2. A spring 10, disposed in a recess 11 tends to elevate the jaw face 6. The movement of this jaw under the movement of the spring is limited by the head of the screw 12. The lower end of this screw is threaded into a forward extension 5ᵇ of the jaw body 5.

The described construction functions, when the chuck jaws are moved forcibly and radially toward the center of the chuck body, to grip the work, W, and cause the movable jaw face to slide downward, pulling the work firmly into place upon the parallels X, thus aligning the work in parallel with the chuck axis, thereby making it possible to machine work quickly and accurately.

When the jaw is released, spring 10 forces the sliding jaw face upward, leaving it set in position to repeat its adjusting function with respect to the work engaged, whenever the jaw body is again moved forcibly toward the work. Such movement, as before stated, may be made by any well known method. At S I have indicated a conventional feed screw for moving the whole jaw radially and at Y I have indicated a slide along which the jaw body may be moved, said slide being provided with a suitable slot for the reception of a head (not shown) of a binding screw 16, in a common and well known way.

I wish it to be understood that the invention is not limited to the precise construction set forth, but that it includes within its purview whatever changes fairly come within either the terms or the spirit of the appended claim.

Having described my invention, what I claim is:

In a structure of the character described, which comprises a jaw body and a sliding jaw, said body having an extension which extends beneath the sliding jaw, and the jaw and jaw body being complementally provided upon their rear and front faces respectively, with inter-engaging, dove-tailed guideways, which are rearwardly inclined from top to bottom; an auxiliary means for connecting said jaw to said body comprising an inclined member, the lower end of which is engaged with that extension of the jaw body which underlies the sliding jaw, said member lying in parallelism with said dove-tailed guideways and passing through the sliding jaw at a point materially in advance of the said guideways, said member being provided with means for limiting the outward movement of the sliding jaw, and a spring encircling said member and bearing between the sliding jaw and the extension of the jaw body and tending to thrust the sliding jaw outwardly.

CLARENCE O. WEBSTER.